US009784824B2

(12) United States Patent
Dunne

(10) Patent No.: US 9,784,824 B2
(45) Date of Patent: Oct. 10, 2017

(54) PSEUDO-STABILIZATION TECHNIQUE FOR LASER-BASED SPEED AND RANGEFINDING INSTRUMENTS UTILIZING A RATE GYROSCOPE TO TRACK PITCH AND YAW DEVIATIONS FROM THE AIMING POINT

(71) Applicants: Laser Technology, Inc., Centennial, CO (US); Kama-Tech (Hk) Limited, Tsim Sha Tsui (HK)

(72) Inventor: Jeremy G. Dunne, Parker, CO (US)

(73) Assignees: Laser Technology, Inc., Centennial, CO (US); Kama-Tech (HK) Limited, Tsim Sha Tsui (HK)

( * ) Notice: Subject to any disclaimer, the term of this patent is extended or adjusted under 35 U.S.C. 154(b) by 420 days.

(21) Appl. No.: 14/524,900

(22) Filed: Oct. 27, 2014

(65) Prior Publication Data

US 2016/0116577 A1    Apr. 28, 2016

(51) Int. Cl.
| | | |
|---|---|---|
| G01C 3/08 | (2006.01) | |
| G01S 7/497 | (2006.01) | |
| G01S 17/02 | (2006.01) | |
| G01S 17/10 | (2006.01) | |
| G01S 17/58 | (2006.01) | |

(52) U.S. Cl.
CPC ............ *G01S 7/497* (2013.01); *G01S 17/023* (2013.01); *G01S 17/10* (2013.01); *G01S 17/58* (2013.01)

(58) Field of Classification Search
CPC .......... G01S 7/497; G01S 17/10; G01S 17/58; G01S 17/023; G01C 19/42
USPC ........................................................ 356/5.01
See application file for complete search history.

(56) References Cited

U.S. PATENT DOCUMENTS

| | | | |
|---|---|---|---|
| 3,435,227 A | 3/1969 | Arazi | |
| 5,574,552 A | 11/1996 | Dunne | |
| 5,612,779 A | 3/1997 | Dunne | |
| 5,652,651 A | 7/1997 | Dunne | |
| 5,703,678 A | 12/1997 | Dunne | |
| 5,880,821 A | 3/1999 | Dunne | |
| 5,926,259 A * | 7/1999 | Bamberger | G01C 3/08 356/4.01 |
| 5,926,260 A | 7/1999 | Dunne et al. | |
| 6,057,910 A | 5/2000 | Dunne | |
| 6,226,077 B1 | 5/2001 | Dunne | |

(Continued)

FOREIGN PATENT DOCUMENTS

EP    0638824 A1    2/1995

OTHER PUBLICATIONS

International Search Report and Written Opinion for International application No. PCT/US15/54159, date of mailing Jun. 21, 2016, 9 pages.

(Continued)

*Primary Examiner* — Mark Hellner
(74) *Attorney, Agent, or Firm* — Hogan Lovells US LLP

(57) ABSTRACT

A pseudo-stabilization technique for laser-based speed and rangefinding instruments utilizing a rate gyroscope to monitor the device pitch and yaw motion to operationally increase the effective range of the device by serving to obviate the emission of laser pulses off-target. In this manner, the pulse firing rate can be increased when the instrument is correctly aimed at the target as well enabling the concomitant emission of pulses with greater energy while remaining within the applicable Class 1 eye-safety constraints.

3 Claims, 4 Drawing Sheets

(56) References Cited

U.S. PATENT DOCUMENTS

| | | |
|---|---|---|
| 6,445,444 B2 | 9/2002 | Dunne |
| 6,871,439 B1 | 3/2005 | Edwards |
| 2004/0231220 A1* | 11/2004 | McCormick ............ F41G 1/473 42/120 |
| 2009/0281660 A1 | 11/2009 | Schmidt et al. |
| 2012/0242974 A1 | 9/2012 | Lavalley et al. |

OTHER PUBLICATIONS

PI Systems, "AUSA: Compact and Lightweight—Pulse Inteco Systems Introduces Next Generation OEM Laser Rangefinder", Industry News, Oct. 6, 2011, URL: http://news.thomasnet.com/fullstory/oem-laser-rangefinder-complies-with-military-standards-603827, pp. 1-4.
International Preliminary Report on Patentability for PCT/US2015/054159, dated May 11, 2017, 8 pages.

* cited by examiner

PSEUDO-STABILIZATION TECHNIQUE FOR LASER-BASED SPEED AND RANGEFINDING INSTRUMENTS UTILIZING A RATE GYROSCOPE TO TRACK PITCH AND YAW DEVIATIONS FROM THE AIMING POINT

BACKGROUND OF THE INVENTION

The present invention relates, in general, to the field of laser rangefinding and speed measurement instruments. More particularly, the present invention relates to a pseudo-stabilization technique for laser-based speed and rangefinding instruments utilizing a rate gyroscope to track the instrument's aiming point and increase the effective range of the device by enabling the placement of a greater percentage of higher power pulses at a higher pulse rate on target while concomitantly adhering to Class 1 eye-safety standards.

Laser rangefinders, such as those designed and produced by Laser Technology, Inc., Centennial, Colo., assignee of the present invention, operate to calculate distance by measuring the time of flight of very short pulses of infrared light. That is, a measurement is made as to the time it takes one or more laser pulses to travel to a target and back with a precision time base. With knowledge of the constant speed of light, the distance the laser pulses have traveled can then be calculated.

In order to increase accuracy, such laser rangefinders are designed to process multiple pulses in a single measurement period, with target acquisition times typically ranging from 0.3 to 0.7 seconds. Sophisticated accuracy validation algorithms are then utilized to ensure reliable distance measurements and eliminate spurious signals due to noise and other factors.

Laser Technology, Inc. has pioneered and developed the design and measurement functionality found in some of the most popular lines of rangefinders and speed measurement instruments currently available on the market. Representative of its proprietary technology is that disclosed in U.S. Pat. Nos. 5,574,552; 5,612,779; 5,652,651; 5,703,678; 5,880,821; 5,926,260; 6,057,910; 6,226,077 and 6,445,444, the disclosures of which are herein specifically incorporated by this reference in their entirety.

Laser-based speed and rangefinding instruments have to adhere to strict eye-safety standards and consumer devices in particular have to adhere to U.S. Food and Drug Administration Title 21 and International Electrotechnical Commission (IEC) 60825 Class 1 standards. These regulations define a 514 nanojoules per pulse energy maximum. In reality, this figure must then be further reduced and divided by the fourth root of the number of pulses emitted in the applicable time base, which is typically just over ten seconds, thereby reducing the number further. In addition to this are the inevitable correction factors which must be accounted for such as $\alpha_{min}$ (alpha min; the angular subtense of a source below which the source can be effectively considered as a point source), beam exit size and the like. All these factors go into a determination of the limit of the nanojoules per pulse that are allowed in order for the instrument to remain within the Class 1 limits.

SUMMARY OF THE INVENTION

Disclosed herein is a pseudo-stabilization technique for laser-based speed and rangefinding instruments utilizing a rate gyroscope to monitor the device pitch and yaw motion to operationally increase the effective range of the device by serving to obviate the emission of laser pulses off-target. In this manner, the pulse firing rate can be increased when the instrument is correctly aimed at the target as well enabling the concomitant emission of pulses with more energy while remaining within the applicable Class 1 eye-safety constraints.

In operation, the increase in range achievable with the technique of the present invention while still complying with Class 1 regulations is effectuated by the capability of being able to put out more energy per pulse. This is accomplished with the knowledge that the instrument receiving section is always attempting to integrate the desired return signal from the target out of the background noise. Since signals received back from something other than the intended target, whether empty space or other objects, are inherently not what is intended, those pulses and their energy are effectively wasted.

Assuming the case where 50 of the emitted pulses are on target and 50%, off target, then the receiver section would be picking up returns from empty space and not the target half of the time and the noise grows as the square root of the number of pulses emitted. Since only 50% of the number of pulses are actually reflected back from the target, it would then take much longer for the signal to be discernable out of the noise. By increasing the percentage number of pulses actually directed toward the target to a higher proportion, the instrument's range can be advantageously improved when the number of reflected pulses goes up relative to the background noise and more energy can then be put into the pulses since the instrument will only be firing when actually aimed within the target zone. Consequently, implementation of the technique of the present invention, enables the pulse repetition frequency (PRF) and/or the pulse energy output to be advantageously increased.

Particularly disclosed herein is a method for controlling the emission of laser pulses from a rangefinding instrument which comprises the steps of detecting depression of a laser fire button, enabling the emission of the laser pulses toward a target if the instrument is aimed within an established tolerance of a center point of the target and inhibiting the emission of the laser pulses toward the target if the instrument is aimed beyond the established tolerance.

Also particularly disclosed herein is a method for outputting pulses from a laser rangefinding instrument which comprises the steps of outputting the pulses when the instrument is aimed at a target and inhibiting output of the pulses when the instrument is not aimed at a target.

Still further disclosed herein is a method for a laser rangefinding instrument which comprises the steps of determining a center point of aim of the instrument at a target when a laser fire button is depressed, inhibiting emission of laser pulses if the instrument is not currently aimed within an established tolerance of the center point and initiating the emission of laser pulses if the instrument is currently aimed within the established tolerance of said center point.

Also further disclosed herein is a laser rangefinding instrument which comprises a microprocessor, a laser transmit section operatively controlled by said microprocessor, a laser receive section coupled to said microprocessor and a rate gyroscope coupled to the microprocessor operative to detect movement of the instrument in at least one of its pitch and yaw axes. The microprocessor enables or disables emission of laser pulses from the laser transmit section when the instrument is then respectively aimed within or beyond an established tolerance of a target center point.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

Figure 1:
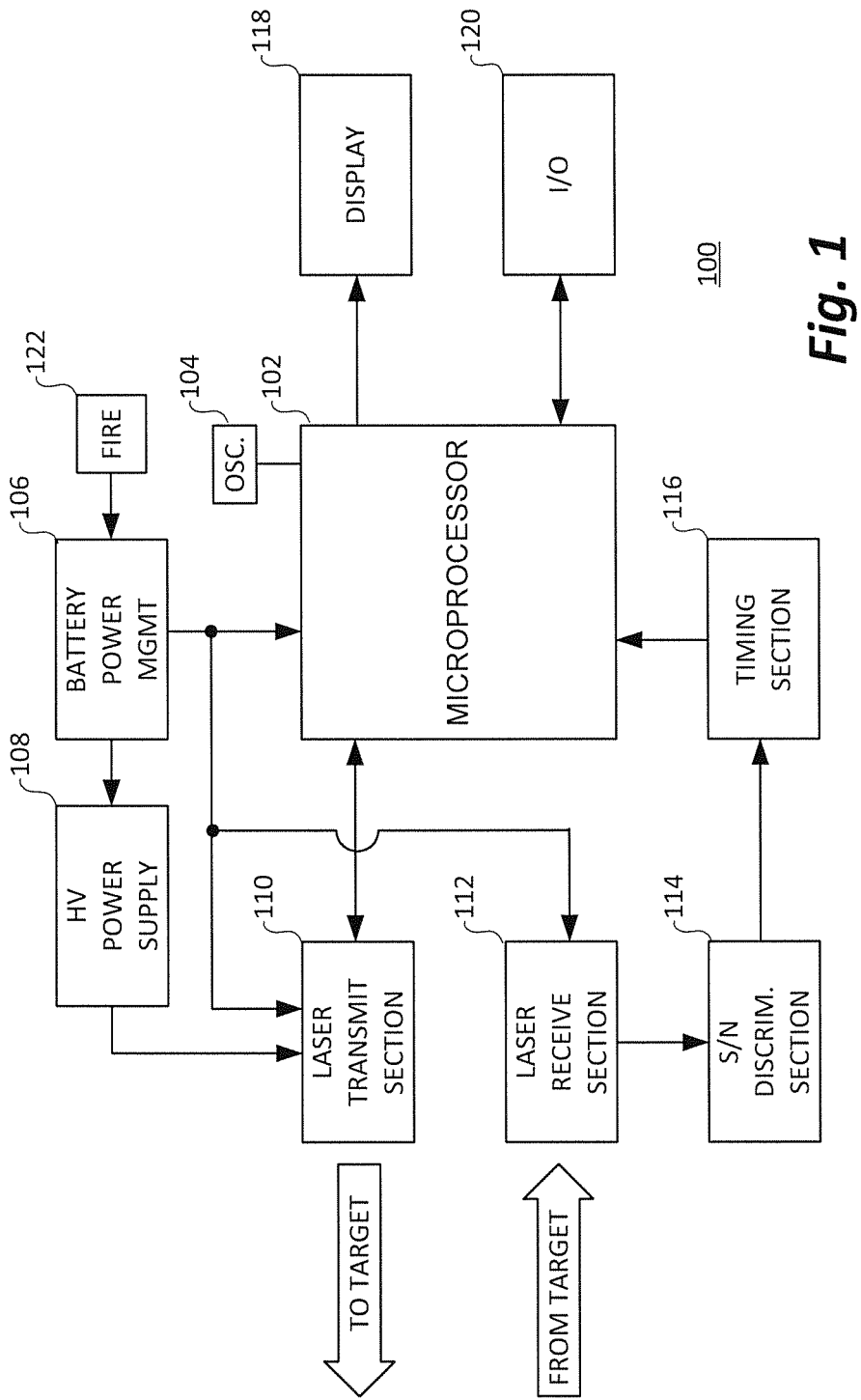
FIG. 1 is a representative functional block diagram of a laser rangefinding and speed measurement instrument for possible incorporation of the pseudo-stabilization technique of the present invention.

With reference now to FIG. 1, a representative functional block diagram of a laser rangefinding and speed measurement instrument 100 is shown for possible incorporation of the pseudo-stabilization technique of the present invention.

The exemplary instrument 100 comprises a microprocessor 102 or central processing unit (CPU) with an associated oscillator 104 for providing clocking signals to the microprocessor 102. A battery and power management section 106 supplies operating power to the microprocessor 102 and various other instrument subsystems (not shown) as well as the high voltage (HV) power supply 108 which provides operating voltage to a laser transmit section 110 and associated laser diode as well as a laser receive section 112 and associated photodiode.

The laser receive section 112 receives a portion of the laser energy transmitted by the laser transmit section 110 as reflected by a target through a photodiode and provides the return signals to a signal/noise (S/N) discriminator section 114 in order to separate true return pulses from any associated noise. A timing section 116 accurately measures the time between the transmission of laser pulses from the laser transmit section 110 and the reception of the same target reflected pulses at the laser receive section 112 to determine, in conjunction with the microprocessor 102, the distance to the particular target towards which the instrument 100 is aimed. A fire button 122 is coupled to the battery and power management section 106 and is operable by a user of the instrument 100 in conjunction with the microprocessor 102 to determine when to emit pulses toward a target from the laser transmit section 110.

The instrument 100 may also incorporate a user viewable display 118, which may include a view of the target in conjunction with an aiming reticule as well as information regarding the range to the target, speed of the target, battery condition and other information. The display 118 may also comprise a touchscreen display to allow user inputs to the instrument 100 in conjunction with, or as an alternative to, an input/output (I/O) section 120.

The I/O section 120 may comprise a keypad or other means of communicating information to or from the microprocessor 102 including wired connections such as a universal serial bus (USB) and the like as well as wireless connections such as an IEEE 802.11 (WiFi), or other wireless local area network (WLAN) transceiver; a Bluetooth transceiver or other personal area network (PAN) system for wirelessly exchanging data over short distances; and/or another near field communication (NFC) transceiver (inclusive of infrared (IR) coupling) for wirelessly coupling the instrument 100 to external devices or data storage elements.

Figure 2:
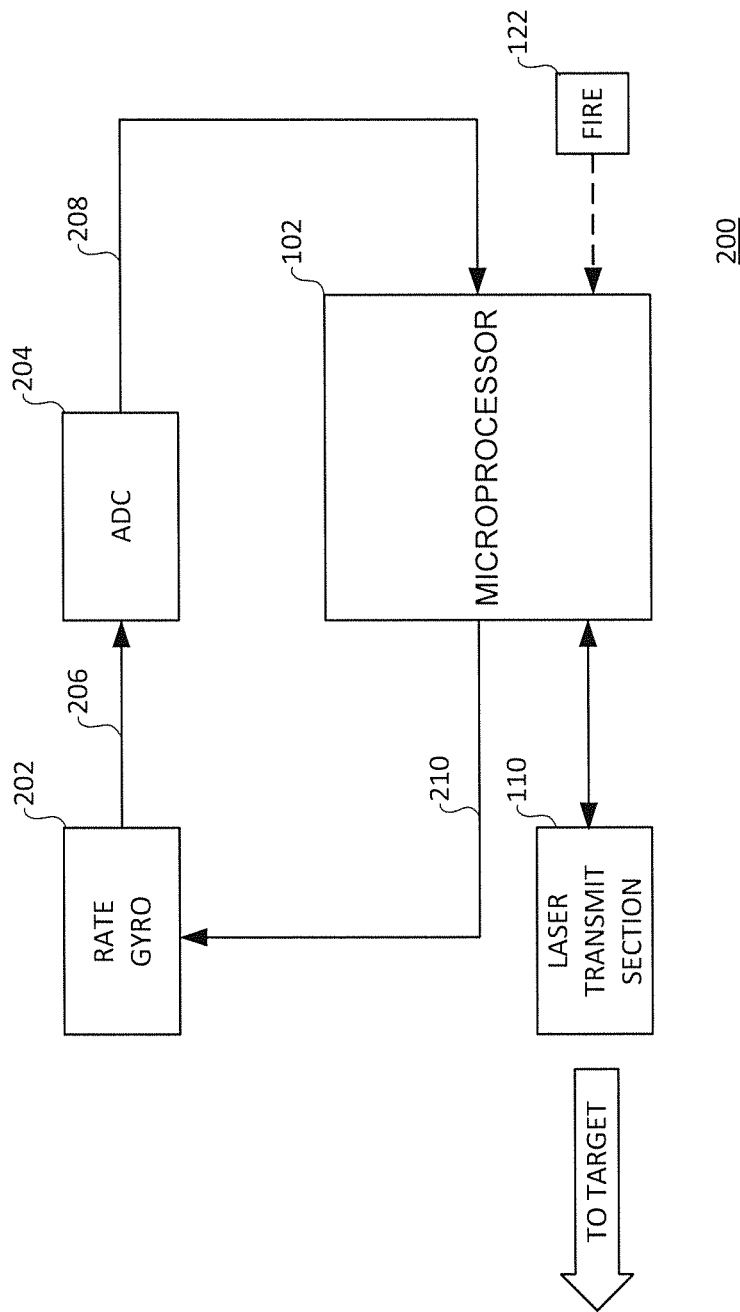
FIG. 2 is a functional block diagram of a representative circuit incorporating a rate gyroscope for possible implementation of the pseudo-stabilization technique of the present invention for addition to the instrument of the preceding figure.

With reference additionally now to FIG. 2, a functional block diagram of a representative circuit 200 incorporating a rate gyroscope for possible implementation of the pseudo-stabilization technique of the present invention for addition to the instrument 100 of the preceding figure is shown.

The circuit 200 incorporates a rate gyroscope (rate gyro) 202 coupled to the microprocessor 102 as illustrated in FIG. 1. The rate gyro 202 may provide an analog output 206 representative of the pitch and yaw of the instrument 100, (FIG. 1) as held and operated by a user, to an analog-to-digital converter (ADC) 204 which provides a digital representation thereof to the microprocessor 102 over a bus 208. In turn, the microprocessor 102 provides digital input signals to the rate gyro 202 on bus 210 which may, in a particular implementation, comprise a serial peripheral interface (SPI), inter-integrated circuit ($I^2C$) or other industry standard or custom bus 210.

As also illustrated, the fire button 122 is operative in conjunction with the microprocessor 102 to cause the laser transmit section 110 (FIG. 1) to begin emitting a series of pulses to the target.

Representative devices which may be utilized for the rate gyro 202 include the MAX21000 series of 3-axis digital output gyroscopes available from Maxim Integrated Products, Inc. and the L3GD20 series of micro electromechanical system (MEMS) devices available from STMicroelectronics, Inc. It should also be noted that in other implementations of the technique of the present invention, the rate gyro 202 may provide a digital output directly to the microprocessor 102 or the function of the ADC 204 may form a portion of the microprocessor 102 without the requirement of a separate circuit element.

Figure 3:
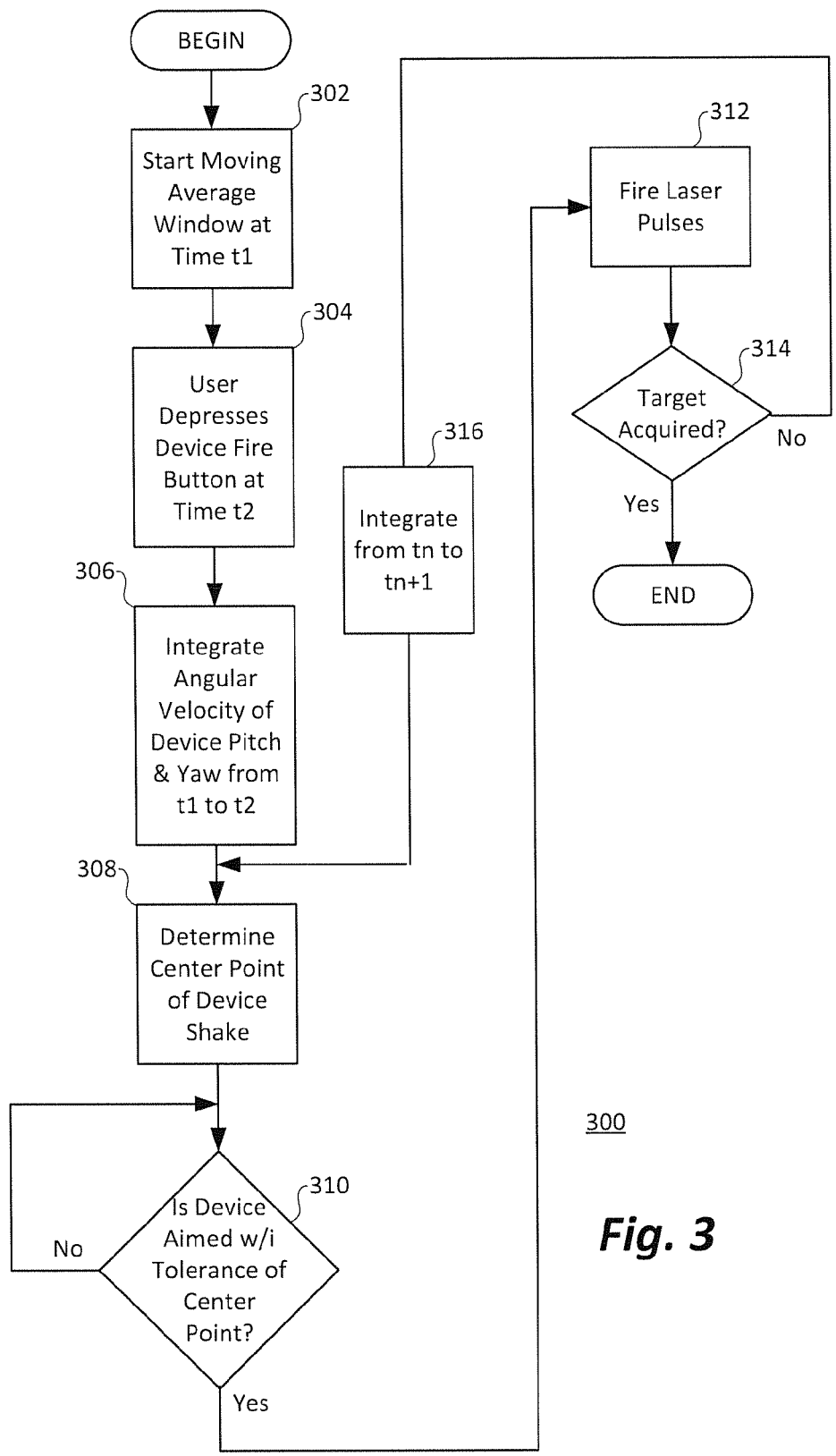
FIG. 3 is a representative logic flowchart for possible implementation of the pseudo-stabilization technique of the present invention.

With reference additionally now to FIG. 3, a representative logic flowchart for possible implementation of the pseudo-stabilization technique of the present invention is shown. The process 300 is initiated by starting, at step 302, a moving average window at time $t_1$. At step 304, a time $t_2$ is established when the user depresses the device fire button, it being assumed that the user did so when he was aiming at the target. The angular velocity of the device pitch and yaw movement due to the user's hand shake is integrated over the time period $t_1$ to $t_2$ at step 306. From this information, the center point of the device shake is determined at step 308.

At decision step 310, if the device is then currently aimed within an established tolerance of the determined center point, the laser pulses are emitted at step 312. If the target has been acquired at decision step 314, the process 300 is concluded, otherwise, the process 300 proceeds to decision step 316 where integration is now performed from time $t_n$ to time $t_{n+1}$ followed by a return to the beginning of decision step 308 to await the device being aimed within the established tolerance of the determined center point.

In operation, consideration of the instrument roll axis is not relevant to the determination as to whether it is actually aimed at the desired target and so, only pitch and yaw need be considered. As indicated previously, the microprocessor 102 ultimately determines an aiming center point, based on pitch and yaw information derived from the rate gyro 202, and then enables the firing of a series of laser pulses toward the target following activation of the fire button 122 by a user.

When the firing button is pressed by the user, the microprocessor 102 software assumes that the user is then aiming the instrument 100 at the desired target. Prior to that time, the rate gyro 202 information is integrated to find the center point of the user's hand "shake". The output of the rate gyro 202 is a rate and basically a +/− angular velocity from a zero point when the instrument 100 is stationary. As the instrument is displaced from a stationary position, an angular velocity +/− from that zero point is detected in pitch and/or yaw. The microprocessor 102 interrogates the rate gyro 202 at a constant rate, for example 100 Hz, and then the integral of the angular velocity ω is determined where $t_2-t_1$ is the moving average window and $t_2$ is the time at which the fire button 122 is depressed.

$$\int_{t_1}^{t_2} \omega \partial t => \theta$$

θ then establishes the approximate center point of the user hand "shake" in both the pitch and yaw axes.

When the user presses the fire button 122, the microprocessor 102 makes a determination as to whether that aiming point is then within a certain tolerance of that center point. If it is, then the laser pulses are fired at the target. Conversely, if the aiming point is not within a certain tolerance of the center point, the laser pulses are not fired. Ultimately then, it is the microprocessor 102 that determines when to fire the laser pulses and not the user. Instead, the user provides input to the microprocessor 102 and it determines when to fire the laser based on its determination of what the aiming point of the instrument 100 currently might be.

Effectively, when a user's hand shakes while aiming the instrument 100 at a target, the microprocessor 102, based on information from the rate gyro 202, determines the midpoint of the hand motion as being the attempted aim point in the axes of pitch and yaw and the laser transmit section 110 will then fire the laser when it is aimed within an established tolerance about the mid-point. This concentrates the laser pulses on the expected position of the target.

This enables the firing of a higher pulse rate while in the target zone for the same average pulse rate. Under the applicable eye-safety classifications, the emitted pulse rate energy is limited as the average number of pulses in a nominal ten second time base or the total number of pulses in the same time base that is used as a correction factor. Consequently, firing pulses off-target is an effective waste of laser energy.

In operation, the instrument 100 is constantly tracking the applicable time window as a moving average with the times $t_1$ and $t_2$ not being fixed. Therefore, the history of the hand shake is constantly being tracked and if that is moving slowly along, the average will be re-centered. In reality, the average is quite a bit slower than the typical hand shake which is on the order of about 3 Hz to 5 Hz for a relatively light object like a rangefinding or speed measurement instrument 100. This then accords a 1 to 2 second time-base, rendering the center point a good bit smoother based on the assumption that the user of the instrument 100 is always trying to keep the center point of aim on the target. The average point will tend to drift but, at all times, whatever the average is, the variation of θ in both pitch and yaw determines whether the instrument 100 will fire laser pulses toward the target or not.

The aiming error for both pitch and yaw may be given as:

$$K_0 \Sigma(\omega_S - \omega_{AVG})$$

where:

$$\omega_{AVG} = \frac{1}{Y+1} \sum_{S=X}^{X+Y} \omega_S$$

Y is chosen to give a reasonable integration time of approximately 1 to 2 seconds. Both the aiming error and $\omega_{AVG}$ are updated at each sample in continuous summation and averaging.

Since the angles are relatively small, the pitch and roll of the instrument 100 can be treated independently. Considering a beam divergence angle of approximately 0.3° a relatively steady hold of the instrument 100 may be on the order of 0.5° while a rather shaky hold may be on the order of 3.0°.

For larger angles, the roll axis of the instrument 100 may need to be considered along with the pitch and yaw axes. In this regard, more rigorous methods for integrating the angular velocity should be employed, for example, quaternion integration or matrix multiplication.

Figure 4A:
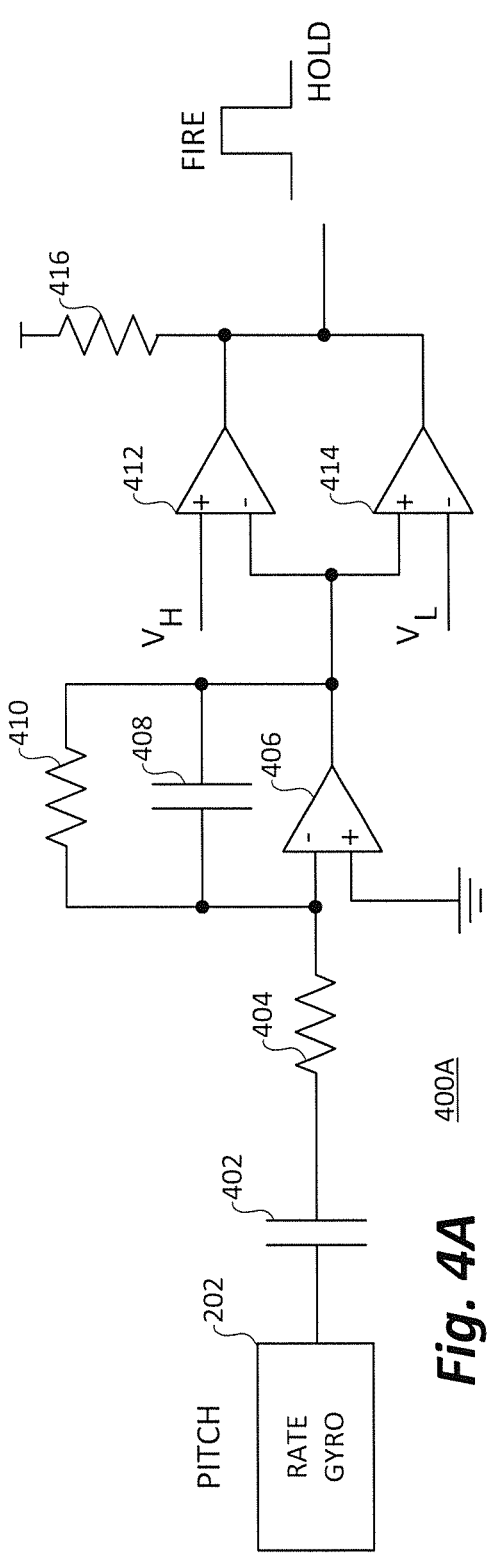
FIGS. 4A and 4B are schematic illustrations of possible analog circuit implementations for providing fire control signals to a microprocessor corresponding to the pitch and yaw movement of a laser rangefinding instrument as respectively determined by a rate gyro.
Figure 4B:
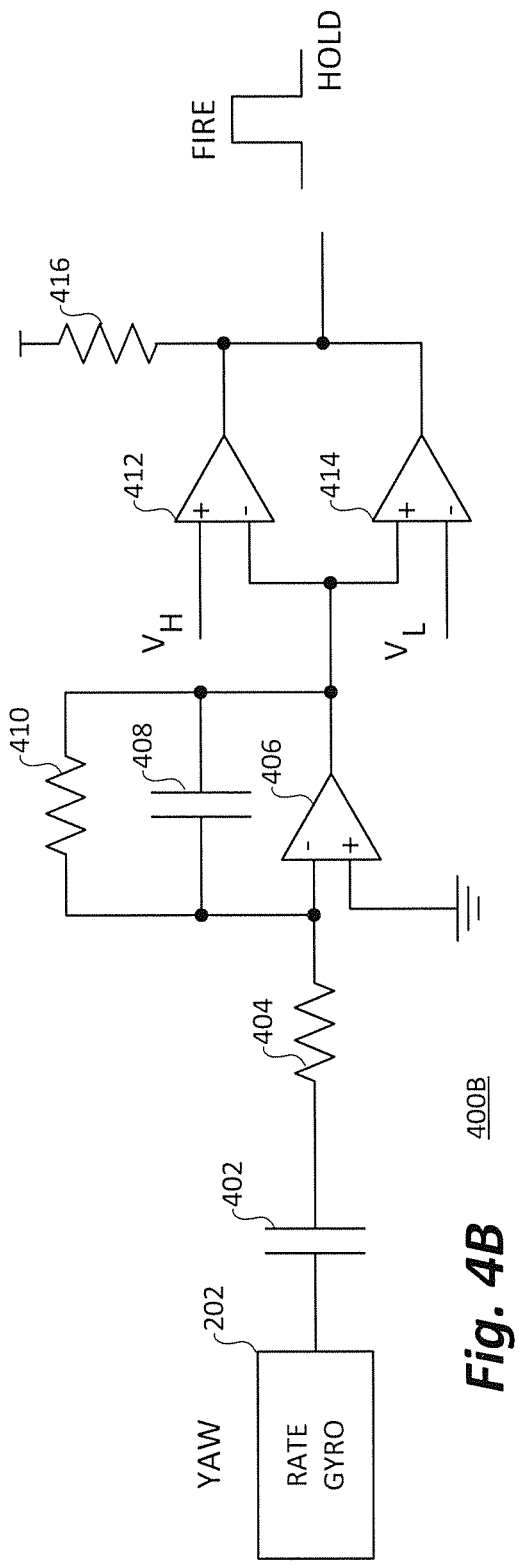

With reference additionally now to FIGS. 4A and 4B schematic illustrations of possible analog circuit 400A and 400B implementations are shown for providing fire control signals to a microprocessor corresponding to the pitch and yaw movement of a laser rangefinding instrument as respectively determined by a rate gyro 202.

Both circuits 400A and 400B comprise a capacitor 402 coupling the output of the rate gyro 202 in series with resistor 404 coupled to the inverting input (−) of an operational amplifier 406 which has its non-inverting input (+) coupled to a reference potential indicated as circuit ground. An additional capacitor 408 and resistor 410 are coupled in parallel across the inverting input and output of the operational amplifier 406.

Output of the operational amplifier 406 is supplied as input to dual comparators 412 and 414 at the inverting input of the former and non-inverting input of the latter. A $V_H$ signal is supplied to the non-inverting input of comparator 412 while a $V_L$ signal is supplied to the inverting input of comparator 414 as shown. The outputs of the dual comparators 412 and 414 are coupled to a circuit potential voltage through resistor 416 and provide a fire/hold input signal to a microprocessor for implementation of the technique of the present invention.

While there have been described above the principles of the present invention in conjunction with specific circuits and methods, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. A method for outputting pulses from a laser rangefinding instrument comprising:
   monitoring motion of said instrument in at least one of pitch and yaw axes;
   determining a center point of said motion;
   comparing said determined center point to a current aim position of said instrument, and if said current aim position of said instrument is within an established tolerance of said center point;
   outputting said pulses when said instrument is aimed at a target; and
   inhibiting output of said pulses when said instrument is not aimed at a target.

2. A method for outputting pulses form a laser rangefinding instrument comprising:
   monitoring motion of said instrument in at least one of pitch and yaw axes;
   determining a center point of said motion;
   comparing said determined center point to a current aim position of said instrument, and if said current aim position of said instrument is beyond an established tolerance of said center point;
   outputting said pulses when said instrument is aimed at a target; and
   inhibiting output of said pulses when said instrument is not aimed at a target.

3. In a laser rangefinding instrument, a method comprising:
   starting a moving average time window at time $t_1$;
   detecting when said laser fire button is depressed at time $t_2$;
   integrating an angular velocity of at least one of pitch or yaw of said instrument from times $t_1$ to $t_2$ to determine said center point;
   inhibiting emission of laser pulses if said instrument is not currently aimed within an established tolerance of said center point; and
   initiating said emission of laser pulses if said instrument is currently aimed within said established tolerance of said center point.

* * * * *